United States Patent
Thomas et al.

(10) Patent No.: US 8,478,335 B2
(45) Date of Patent: Jul. 2, 2013

(54) SYSTEM AND METHOD FOR RADIO COMMUNICATION

(75) Inventors: Nathan L. Thomas, Bloomington, IN (US); James M. Seals, Loogootee, IN (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 267 days.

(21) Appl. No.: 13/070,326

(22) Filed: Mar. 23, 2011

(65) Prior Publication Data

US 2012/0244895 A1    Sep. 27, 2012

(51) Int. Cl.
 *H04M 1/00*    (2006.01)
 *H04B 1/38*    (2006.01)
 *H04B 1/40*    (2006.01)

(52) U.S. Cl.
 USPC ............ 455/552.1; 455/73; 455/88; 455/551; 455/560

(58) Field of Classification Search
 USPC ............... 455/73, 88, 551, 552.1, 560, 62, 455/63.4, 78, 456
 See application file for complete search history.

(56) References Cited

U.S. PATENT DOCUMENTS

| | | | |
|---|---|---|---|
| 2,598,064 A | 5/1952 | Lindenblad | |
| 2,626,348 A | 1/1953 | Nobles | |
| 5,838,674 A | 11/1998 | Forssén et al. | |
| 5,841,816 A | 11/1998 | Dent et al. | |
| 5,916,306 A * | 6/1999 | Ruiz | 709/242 |
| 6,252,867 B1 | 6/2001 | Pfeil et al. | |
| 6,369,758 B1 | 4/2002 | Zhang | |
| 6,917,786 B1 | 7/2005 | Mizuguchi | |
| 6,941,153 B2 | 9/2005 | Kim et al. | |
| 6,968,022 B1 | 11/2005 | Poor et al. | |
| 7,221,698 B2 | 5/2007 | Kimata | |
| 7,483,718 B2 | 1/2009 | Catreux-Erceg et al. | |
| 7,502,764 B2 | 3/2009 | Son et al. | |
| 7,657,244 B2 | 2/2010 | Niu et al. | |
| 7,760,828 B2 | 7/2010 | Visoz et al. | |
| 2005/0038608 A1* | 2/2005 | Chandra et al. | 702/19 |
| 2005/0108374 A1 | 5/2005 | Pierzga et al. | |
| 2007/0178839 A1* | 8/2007 | Rezvani et al. | 455/62 |
| 2008/0057880 A1 | 3/2008 | Copeland | |
| 2008/0170554 A1 | 7/2008 | Wang et al. | |
| 2010/0002620 A1 | 1/2010 | Proctor, Jr. et al. | |
| 2010/0014504 A1 | 1/2010 | Sun et al. | |
| 2010/0120466 A1* | 5/2010 | Li | 455/552.1 |
| 2010/0232533 A1 | 9/2010 | Lee et al. | |

FOREIGN PATENT DOCUMENTS

| | | |
|---|---|---|
| EP | 1124281 A2 | 8/2001 |
| EP | 1643661 A2 | 4/2006 |
| EP | 2086140 A1 | 8/2009 |
| GB | 2382927 A | 6/2003 |
| KR | 20080007529 A | 1/2008 |
| WO | WO 01/63784 A1 | 8/2001 |
| WO | WO 2005/069437 A1 | 7/2005 |
| WO | WO 2007/127796 A1 | 11/2007 |
| WO | WO 2009/083647 A1 | 7/2009 |

* cited by examiner

*Primary Examiner* — Yuwen Pan
*Assistant Examiner* — Xin Jia
(74) *Attorney, Agent, or Firm* — Christopher A. Morsey

(57) ABSTRACT

A system and method for radio communication is provided. The system includes a plurality of radios configured to communicate over a plurality of antennas. A switch assembly provides selective coupling of a radio to an antenna. The switch assembly includes a programmable logic device configured to execute an algorithm to select an antenna configuration.

26 Claims, 9 Drawing Sheets

| CASE # | Radio 12 | Antennas 14 | | | | | Control inputs 76 | | | | | | | | |
|---|---|---|---|---|---|---|---|---|---|---|---|---|---|---|---|
| | | Lower | Upper | Low Angle | High Angle | ADF | CSC ANT SEL | CSC DF SEL | CSC OTPI AGC | Data Rate Select #1 | Data Rate Select #2 | Radio #1 DUPLEX | Radio #2 DUPLEX | Radio #3 DUPLEX | SATCOM ANT SEL |
| 1 | #1 | V/UHF | | | | | H | H | H | H | H | H | H | L | H |
| | #2 | | V/UHF | | | | | | | | | | | | |
| | #3 | | | | SATCOM | | | | | | | | | | |
| 2 | #1 | | V/UHF X | | | ADF | L | L | H | H | H | H | H | H | H/L |
| | #2 | V/UHF | | | | | | | | | | | | | |
| | #3 | | | V/UHF | | | | | | | | | | | |
| 3 | #1 | V/UHF | | | | ADF | H | L | H | L | H | H | L | H | H |
| | #2 | | | | SATCOM | | | | | | | | | | |
| | #3 | | | V/UHF | | | | | | | | | | | |
| 4 | #1 | V/UHF | | | | ADF | H | L | H | L | H | H | L | H | L |
| | #2 | | | SATCOM | | | | | | | | | | | |
| | #3 | | | V/UHF | | | | | | | | | | | |
| 5 | #1 | V/UHF | | | | ADF | H | L | H | L | H | H | H | H | H/L |
| | #2 | | | V/UHF | | | | | | | | | | | |
| | #3 | | | V/UHF | | | | | | | | | | | |
| 6 | #1 | V/UHF | | | | ADF | L | L | H | L | H | H | L | H | H |
| | #2 | | | | SATCOM | | | | | | | | | | |
| | #3 | V/UHF | | | | | | | | | | | | | |
| 7 | #1 | V/UHF | | | | ADF | L | L | H | L | H | H | L | H | L |
| | #2 | | | SATCOM | | | | | | | | | | | |
| | #3 | V/UHF | | | | | | | | | | | | | |
| 8 | #1 | | RELAY | | | | L | H | L | H | H | H | H | L | H |
| | #2 | RELAY | | | | | | | | | | | | | |
| | #3 | | | | SATCOM | | | | | | | | | | |
| 9 | #1 | | RELAY | | | | L | H | L | H | H | H | H | L | L |
| | #2 | RELAY | | | | | | | | | | | | | |
| | #3 | | | SATCOM | | | | | | | | | | | |
| 10 | #1 | | | | RELAY | | H | H | L | H | L | L | H | H | H |
| | #2 | | RELAY | | | | | | | | | | | | |
| | #3 | V/UHF | | | | | | | | | | | | | |

Legend

H=logic high
L=logic low
H/L= Don't Care

FIG. 5

```
% Compare Copied Inputs with expected outputs -
Generate BIT Failure if failure exists% if cpy_control[8..0] == control[8..0] THEN
case cpy_control[8..0] IS
WHEN B"111111101" => % CASE #1 %
        extra_out[5..0] = 1;
        IF relay_output[36..0] ==
        !B"0111011101110110110110111111111111" THEN
                BIT_FAIL = VCC;
                VALID = VCC;
        ELSE
                BIT_FAIL = GND;
                VALID = GND;
        END IF;
WHEN B"00111111X" => % CASE #2 %
        extra_out[5..0] = 38;
        IF relay_output[36..0] ==
        !B"1110101110110110111001101111100100000" THEN
                BIT_FAIL = VCC;
                VALID = VCC;
        ELSE
                BIT_FAIL = GND;
                VALID = GND;
        END IF;
WHEN B"101011011" => % CASE #3 %
        extra_out[5..0] = 39;
        IF relay_output[36..0] ==
        !B"1101110101111100110111011010101101011" THEN
                BIT_FAIL = VCC;
                VALID = VCC;
        ELSE
                BIT_FAIL = GND;
                VALID = GND;
        END IF;
```

FIG. 9

SYSTEM AND METHOD FOR RADIO COMMUNICATION

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

BACKGROUND AND SUMMARY

The present disclosure relates generally to a system and method for radio communication. More particularly, the present disclosure relates to a switch unit configured to couple a plurality of radios to a plurality of antennas based on a selected antenna configuration.

Radio communication systems may include multiple radios configured to communicate signals over multiple antennas. In these systems, each radio may be coupled to at least one antenna for transmitting and receiving signals. Further, the antennas may be tuned to handle the frequencies transmitted and received by the corresponding radio. The antennas of such systems may be allocated manually to particular radios, or a multiplexer device may be used to allocate the antennas to the radios automatically. In a multiplexer system, a failure or malfunction of the multiplexer device may lead to the inoperability of the radio communication system.

According to one illustrated embodiment of the present disclosure, a failsafe system for a radio communication system is provided. The failsafe system includes a plurality of antennas and a plurality of radios configured to communicate a radio signal over the plurality of antennas. The failsafe system further includes a switch assembly and a controller coupled to the switch assembly. The switch assembly includes a control device and a plurality of switches in communication with the control device. The switch assembly is configured to selectively couple the plurality of radios to the plurality of antennas based on an antenna connection scheme. The control device includes a first circuitry portion and a second circuitry portion. The controller is configured to provide a plurality of control signals to the control device of the switch assembly, and the plurality of control signals identify an antenna connection scheme for coupling each radio to at least one antenna. The control device is further configured to implement the identified antenna connection scheme based on the plurality of control signals, wherein the control signals are received by the first circuitry portion and the second circuitry portion of the control device. The first circuitry portion is configured to produce a first output based on the control signals, and the second circuitry portion is configured to produce a second output based on the control signals. The first output is configured to identify a first antenna connection scheme, and the second output is configured to identify a second antenna connection scheme. The switch assembly implements a default antenna connection scheme upon the first antenna connection scheme identified with the first output being different from the second antenna connection scheme identified with the second output.

According to another illustrated embodiment of the present disclosure, a failsafe method for a radio communication system is provided. The method includes the step of providing a plurality of antennas, a plurality of radios configured to communicate over the plurality of antennas, a switch assembly including a control device, and a controller coupled to the switch assembly. The control device includes a first circuitry portion and a second circuitry portion, and the switch assembly is configured to selectively couple the plurality of radios to the plurality of antennas based on an antenna connection scheme. The method includes providing a plurality of control signals to the control device of the switch assembly, the plurality of control signals identifying a selected antenna connection scheme for coupling each radio to at least one antenna. The method includes executing a first algorithm with the first circuitry portion to produce a first output, the first algorithm being based on the plurality of control signals, and providing a first antenna connection scheme with the first output. The method further includes executing a second algorithm with the second circuitry portion to produce a second output, the second algorithm being based on the plurality of control signals, and providing a second antenna connection scheme with the second output. The method further includes comparing the first output and the second output and implementing a default antenna connection scheme upon the first antenna connection scheme provided with the first output being different from the second antenna connection scheme provided with the second output.

According to yet another illustrated embodiment of the present disclosure, a method of selectively coupling radios to antennas in a radio communication system is provided. The method includes the steps of providing a plurality of antennas, a plurality of radios configured to communicate over the plurality of antennas, a switch assembly including a programmable device, and a controller configured to provide a plurality of control inputs to the programmable device of the switch assembly. The plurality of control inputs cooperate to form a control input pattern representative of an antenna configuration. The switch assembly is configured to selectively couple each radio to at least one antenna based on the antenna configuration. The method includes receiving an antenna map including a plurality of case statements, each case statement associating an antenna configuration with a control input pattern. The antenna map is linked to a source code for programming the programmable device of the switch assembly, and the source code provides the plurality of case statements of the antenna map to the programmable device. The source code includes an identifier. The method includes modifying a first case statement of the antenna map, the first case statement associating a first antenna configuration with a first control input pattern. The modifying step includes modifying at least one of the first antenna configuration and the first control input pattern. The method includes automatically updating the source code with the modified first case statement upon modifying the first case statement, the updating step including modifying the identifier of the source code. The method includes automatically reconfiguring the programmable device with the updated source code based on the modified identifier of the updated source code. The method further includes implementing the first antenna configuration with the programmable device based on the modified first case statement, and communicating between the plurality of radios and the plurality of antennas according to the first antenna configuration.

Additional features and advantages of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many of the attendant advantages of this invention will become more readily appreciated

FIG. 5 illustrates an exemplary antenna map for configuring the control device of FIG. 3;

FIG. 9 illustrates an exemplary portion of a source code of the control device of FIG. 3.

Figure 1:
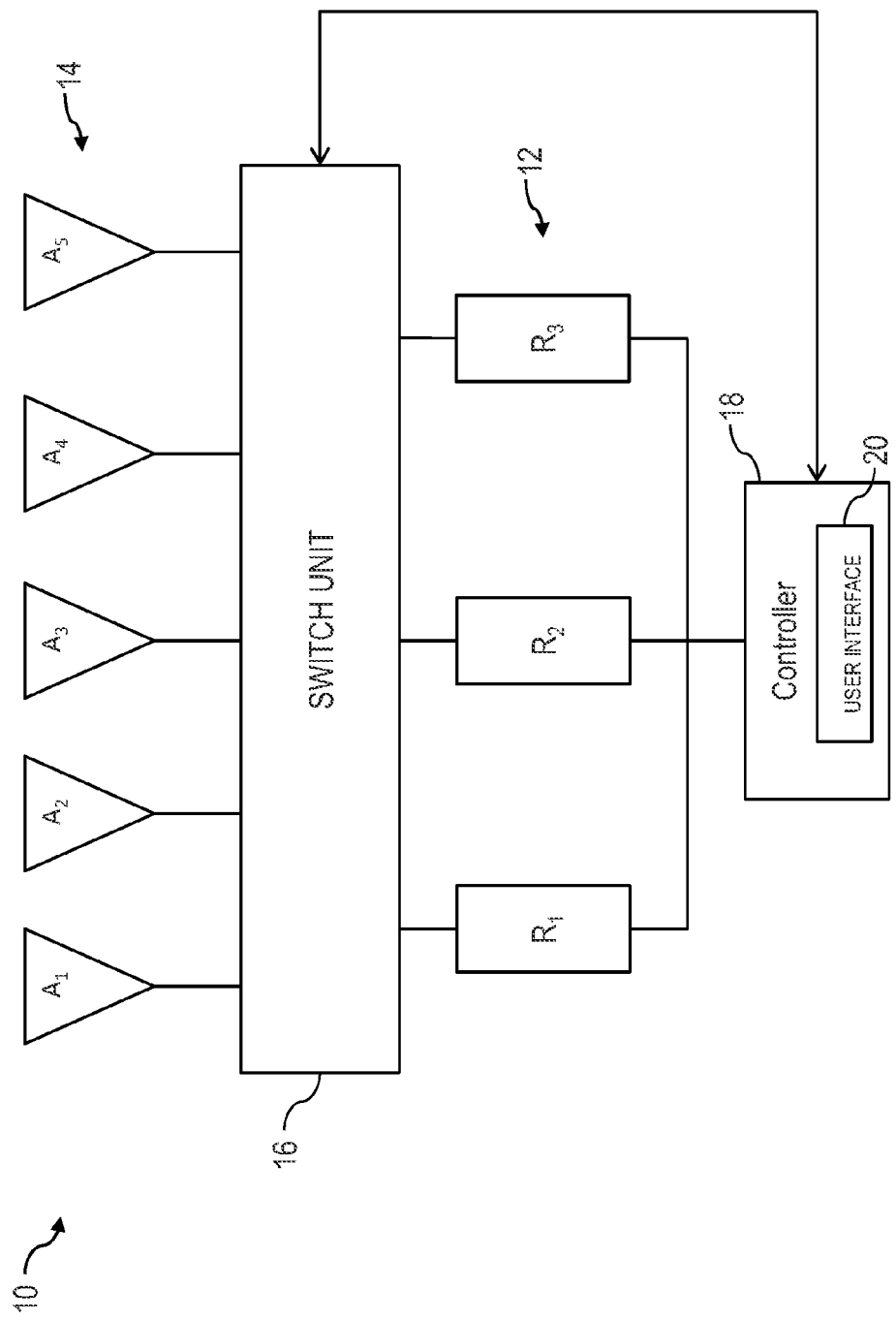
FIG. 1 illustrates an exemplary radio communication system according to one embodiment.

Corresponding reference characters indicate corresponding parts throughout the several views. Although the drawings represent embodiments of various features and components in the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, an exemplary radio communication system 10 is shown. Radio communication system 10 includes a plurality of radios 12 configured to communicate over a plurality of antennas 14. A switch unit or assembly 16 selectively interconnects radios 12 and antennas 14. In one embodiment, switch unit 16 is configured to switch each radio 12 between multiple antennas 14 in several functions. Exemplary functions include voice, data, and relay functions. In one embodiment, switch unit 16 serves as a multiplexer configured to couple each radio 12 to at least one antenna 14. In the illustrated embodiment, radio communication system 10 is used in an aircraft for communicating radio frequency (RF) signals to a ground station or to another aircraft. Radio communication system 10 may also be used in a law enforcement vehicle, a ground station, a maritime vessel, or in any other suitable environment or system using multiple radios and multiple antennas.

Radio communication system 10 includes a controller 18 having a user interface 20 for receiving user input. In one embodiment, controller 18 is a computer system configured to control radio communication system 10. For example, controller 18 may be provided on an aircraft for controlling radios 12 and antennas 14 and other communications systems. User interface 20 of controller 18 provides several user inputs for selecting an antenna configuration or antenna connection scheme. See, for example, user interface 20 illustrated in FIG. 4 and described herein. In the illustrated embodiment, controller 18 provides control signals to switch unit 16 that are representative of the selected antenna configuration, and switch unit 16 implements the selected antenna configuration based on the received control signals. In the illustrated embodiment, the antenna configuration identifies the connection scheme between radios 12 and antennas 14.

Antennas 14 illustratively include antennas $A_1, A_2, A_3, A_4, A_5$, although fewer or more antennas 14 may be provided. In the illustrated embodiment, antennas 14 are configured to communicate over various radio frequencies and in various modes. In one embodiment, antennas $A_1$ and $A_2$ are SATCOM antennas, i.e., satellite communication antennas. In one embodiment, antenna $A_1$ is a low angle SATCOM antenna, and antenna $A_2$ is a high angle SATCOM antenna. Antennas $A_1, A_2$ may alternatively be dual-mode SATCOM antennas configured to operate in either of low-angle or high-angle mode. In the illustrated embodiment, the angle mode corresponds to the direction or coverage area in which the antennas $A_1, A_2$ are configured to transmit and receive signals in relation to the aircraft. In particular, in a low-angle mode, antenna $A_1$ is configured to transmit and receive signals below the aircraft. In a high-angle mode, antenna $A_2$ is configured to transmit and receive signals above the aircraft. In one embodiment, the low angle or high angle mode for antennas $A_1, A_2$ is selectable by an operator at user interface 20, such as with a toggle switch or button, for example.

In one embodiment, antennas $A_3$ and $A_4$ are VHF/UHF (very high frequency/ultra high frequency) antennas. In one embodiment, antenna $A_3$ is a lower VHF/UHF antenna, and antenna $A_4$ is an upper VHF/UHF antenna. Similar to the angle mode of the SATCOM antennas $A_1, A_2$, the lower VHF/UHF antenna $A_3$ is configured to transmit and receive signals below the aircraft, and the upper VHF/UHF antenna $A_4$ is configured to transmit and receive signals above the aircraft. Antennas $A_3, A_4$ may alternatively be dual-mode VHF/UHF antennas configured to operate in both upper and lower VHF/UHF modes. In one embodiment, the upper or lower mode for antennas $A_3, A_4$ is selectable by an operator at user interface 20, such as with a toggle switch or button, for example. In one embodiment, antenna $A_5$ is a dual frequency antenna configured to operate at multiple frequencies. In particular, antenna $A_5$ may be configured to operate at two different radio frequencies. Other antennas $A_1$-$A_4$ may also be configured to operate in a dual frequency mode. Antennas 14 may include other types and combinations of antennas.

In one embodiment, low-angle antenna $A_1$ and lower VHF/UHF antenna $A_3$ are configured to communicate with radio systems located on the ground. Similarly, high-angle antenna $A_2$ and upper VHF/UHF antenna $A_4$ are configured to communicate with radio systems located in the air. In one embodiment, antennas 14 and radios 12 may cooperate to relay signals received in the air above the aircraft to the ground, and vice versa, as described herein.

Radios 12 illustratively include radios $R_1, R_2,$ and $R_3$, although additional or fewer radios 12 may be provided. Radios 12 are configured to operate at a plurality of selectable radio frequencies and modes. In one embodiment, radios 12 have a frequency range of 30-400 MHz, although radios 12 may have other frequency ranges. In the illustrated embodiment, radios 12 are configured to communicate over one or more antennas 14. In one embodiment, radios $R_1$ and $R_2$ are configured to communicate over upper VHF/UHF, lower VHF/UHF, high/low angle SATCOM, and dual frequency antennas 14. In one embodiment, radio $R_3$ is configured to communicate over upper and lower VHF/UHF antennas 14 and high/low angle SATCOM antennas 14 but not over dual frequency antennas 14. In one embodiment, one or more radios 12 operate as radio relays configured to receive a signal over one antenna 14 and to relay the signal over another antenna 14, as described herein.

Figure 2:
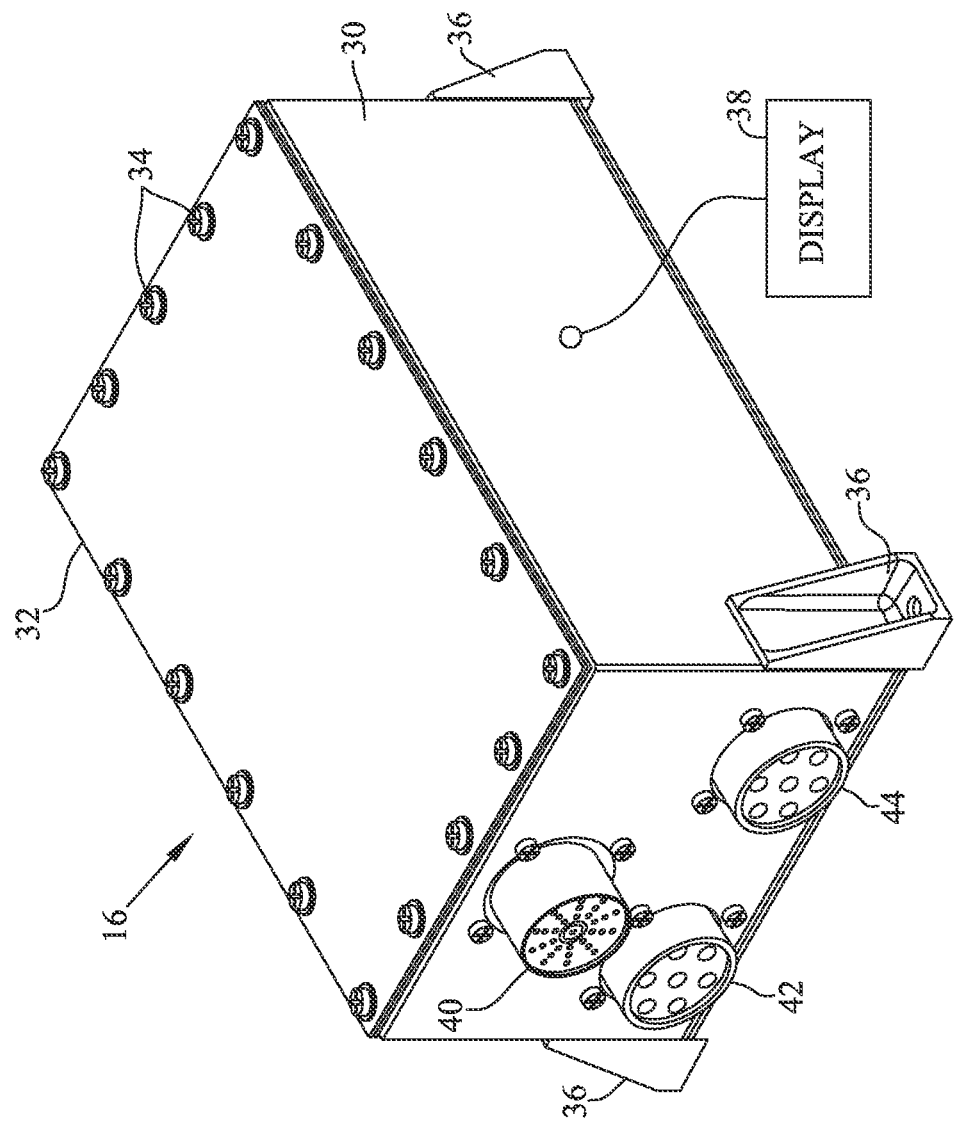
FIG. 2 illustrates an exemplary switch unit of the radio communication system of FIG. 1.

Referring to FIG. 2, an exemplary switch unit 16 is illustrated. Switch unit 16 includes a housing 30 and a cover 32 coupled to housing 30 with fasteners 34. In the illustrated embodiment, housing 30 is made of aluminum alloy. Switch unit 16 includes mounting brackets 36 and connectors 40, 42, 44. Connectors 40, 42, 44 provide an interface between switch unit 16 and controller 18, radios 12, and antennas 14. In the illustrated embodiment, connector 40 provides inputs and outputs for control lines for radios 12, controller 18, a data processor, a high power amplifier (HPA), and a low noise amplifier (LNA). See, for example, exemplary control inputs 70 and radio signals 78, 80 illustrated in FIG. 3 and described herein. The HPA and LNA may be used to amplify the radio signals received at switch unit 16. In one embodiment, the HPA and LNA are positioned between the antennas 14 and switch unit 16 for amplifying signals received from or transmitted over antennas 14. In one embodiment, the data processor is used to process digital communication or to convert radio frequency signals into a digital signal understandable by switch unit 16.

Connector 40 further provides power to switch unit 16. See, for example, power line 81 illustrated in FIG. 3. In the illustrated embodiment, connector 42 provides RF connections to radios 12, and connector 44 provides RF connections to antennas 14. Connectors 40, 42, 44 include a plurality of contacts for receiving signal carrying wires from controller 18, radios 12, and antennas 14. In the illustrated embodiment, connector 40 is a 100-pin connector, and connectors 42, 44 are 7-pin connectors. In one embodiment, switch unit 16 includes a display 38, such as an LCD display, providing data to a user. Exemplary data provided by display 38 may include the current antenna configuration, system faults, and other operating parameters of switch unit 16.

In one embodiment, switch unit 16 provides a one-radio-to-many-antennas feature for coupling multiple antennas 14 to a single radio 12. In this embodiment, radio 12 may communicate a single signal over multiple antennas 14 or multiple signals over multiple antennas 14.

Figure 3:
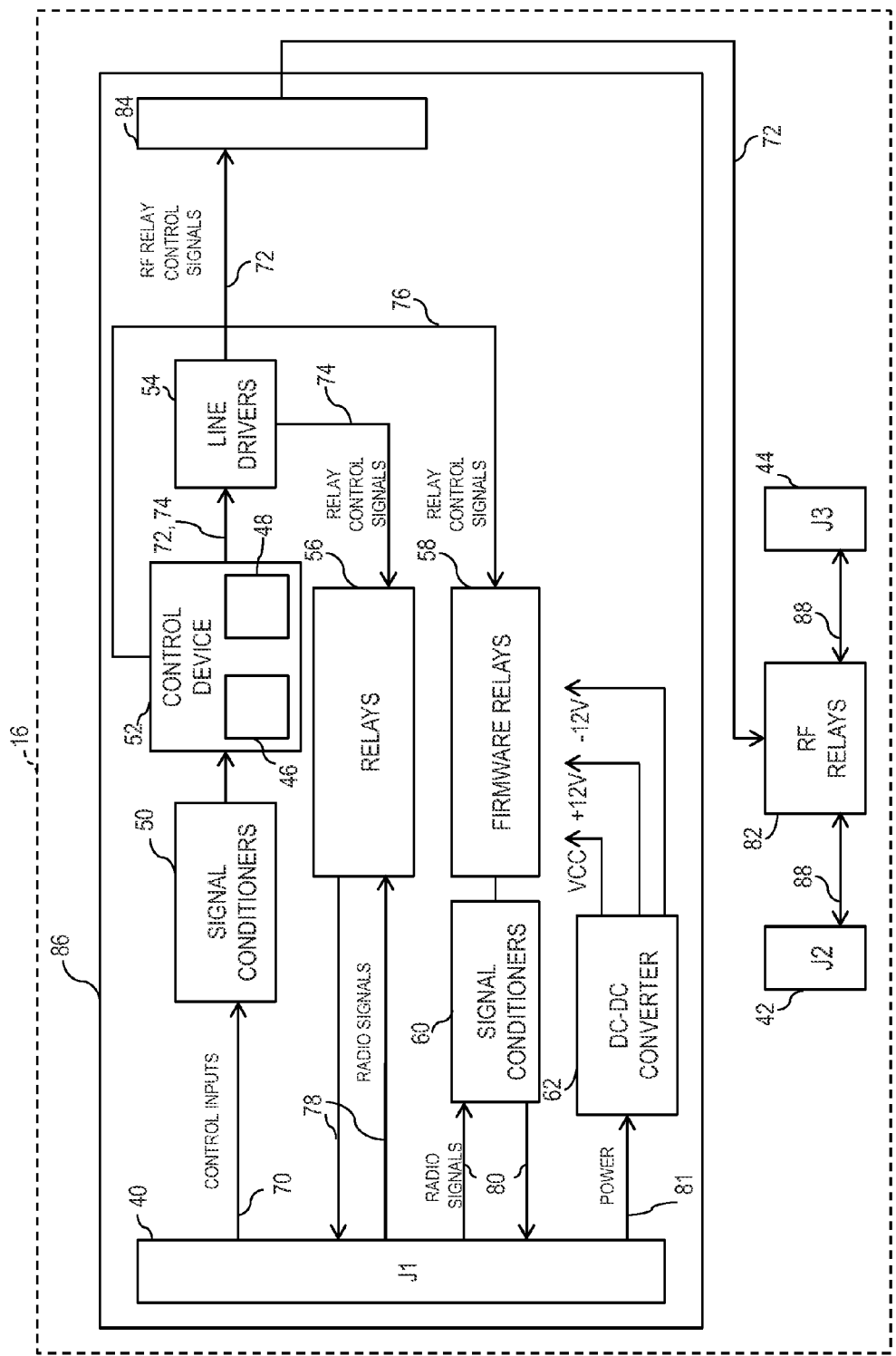
FIG. 3 illustrates a representative view of the switch unit of FIG. 2 including a control device.

Referring to FIG. 3, switch unit 16 includes a control device 52, signal conditioners 50, 60, line drivers 54, and switches or relays 56, 58, 82. Signal conditioner 50 is configured to process control inputs 70 received from controller 18, and signal conditioner 60 is configured to process radio signals 80 received from radios 12. In the illustrated embodiment, signal conditioners 50, 60 include a plurality of comparator circuits (e.g. Schmitt triggers, op-amps, etc.) configured to regulate the voltage and/or to reduce the signal noise of control inputs 70 and radio signals 80. In one embodiment, signal conditioner 50 reduces the DC voltage level (e.g. 28 VDC) of control inputs 70 to provide a TTL level signal (e.g. 0 to 5 volt) receivable by control device 52. In one embodiment, signal conditioner 60 reduces the voltage level (e.g. 28 VDC) of radio signals 80 to provide a TTL level signal (e.g. 0 to 5 volt) to relays 58 of switch unit 16.

Control device 52 provides the control logic and processing capabilities of switch unit 16. In the illustrated embodiment, control device 52 is programmable or reconfigurable. Control device 52 may include a programmable logic device, a microprocessor, or any other reconfigurable digital circuit. An exemplary control device 52 is a programmable logic device such as a MAX series (e.g. MAX 7000S) PLD available from Altera Corporation. In the illustrated embodiment, a firmware source code is used to program control device 52. See, for example, exemplary portion 94 of source code 92 illustrated in FIG. 9 and described herein. In one embodiment, control device 52 includes a plurality of logic gates programmable in a specific configuration or pattern based on the source code. Once programmed, control device 52 is configured to implement a selected antenna configuration of radio communication system 10 based on control inputs 70 received from controller 18. In the illustrated embodiment, control device 52 is reprogrammable, as described herein and illustrated in FIG. 7.

In the illustrated embodiment, control device 52 is configured to control and manipulate relays and radio/control signals within switch unit 16. As illustrated in FIG. 3, the output of control device 52, including control signals 72, 74, 76, is configured to control relays 56, 58, 82 of switch unit 16. In one embodiment, relays 58 are low voltage relays that receive TTL level control signals from control device 52, and relays 56, 82 are high voltage relays that receive a 28 VDC signal from control device 52 via line drivers 54. Line drivers 54 are configured to condition a portion of the control signals provided from control device 52. In the illustrated embodiment, line drivers 54 are configured to increase the voltage level (e.g. 5 VDC) of control signals 72, 74 to provide a higher voltage signal (e.g. 28 VDC) for controlling relays 56, 82 of switch unit 16.

In the illustrated embodiment, radio signals 78, 80 are control signals communicated between radios 12 and antennas 14 for configuring and tuning antennas 14. Antennas 14 are tuned to a proper frequency and/or mode based on radio signals 78, 80 received from radios 12. In one embodiment, one or more antennas 14 include a processor configured to process the received radio signals 78, 80 and to tune the antenna 14 based on the received radio signals 78, 80. For example, a radio 12 may transmit a radio signal 78 to an antenna 14 instructing the recipient antenna 14 to tune to a certain VHF/UHF frequency. Upon receipt, the antenna 14 configures itself such that it may communicate over the selected frequency. In one embodiment, the frequencies of VHF/UHF antennas $A_3$, $A_4$ are tunable while the frequencies of SATCOM antennas $A_1$, $A_2$ are not tunable. Relays 56, 58 of switch unit 16 are configured to transmit radio signals 78, 80, respectively, to appropriate antennas 14. In the illustrated embodiment, control signals 74, 76 received from control device 52 selectively activate relays 56, 58, respectively, such that relays 56, 58 direct the respective radio signals 78, 80 to appropriate antennas 14. In one embodiment, radio signals 78, 80 include signals transferred from antennas 14 to radios 12. In one embodiment, relays 58 are firmware relays contained within control device 52.

Relays 82 are radio frequency (RF) relays configured to transmit RF signals between radios 12 and appropriate antennas 14 based on the selected antenna configuration. Control signals 72 provided with control device 52 are configured to control relays 82 based on control inputs 70 that are representative of the selected antenna configuration. In the illustrated embodiment, relays 82 transmit RF signals 88 received from radios 12 via connector 42 to antennas 14 via connector 44. Similarly, relays 82 transmit RF signals 88 received from antennas 14 to radios 12. In one embodiment, RF cables are coupled between connectors 42, 44 and relays 82 for transmitting RF signals 88. In one embodiment, RF relays 82 have a frequency range of DC-18 GHz, although relays 82 may have other suitable frequency ranges. An exemplary relay 82 is a Model No. SR-2MIN-D available from RLC Electronics.

Switch unit 16 illustratively receives power 81 from an external power source through connector 40. Switch unit 16 includes a DC-DC converter 62 configured to provide a regulated voltage supply Vcc to switch unit 16. In one embodiment, Vcc is a 5 VDC supply for the integrated circuits and other powered components of switch unit 16. DC-DC converter 62 also illustratively provides +12V and −12V supply for various components of switch unit 16.

In the illustrated embodiment, signal conditioners 50, 60, control device 52, line drivers 54, and relays 56, 58 are all integrated circuit devices provided on a printed circuit board (PCB) 86. In the illustrated embodiment, switch unit 16 includes an electrical connector 84 coupled to PCB 86 for coupling line drivers 54 to relays 82. In one embodiment, connector 84 is configured to receive a removable wire harness coupled to relays 82. In one embodiment, relays 82 are mounted to a thermal pad to facilitate the dissipation of heat generated by relays 82. In one embodiment, a magnetic shield is provided between adjacent relays 82 mounted within housing 30 to magnetically isolate each relay 82.

Figure 4:
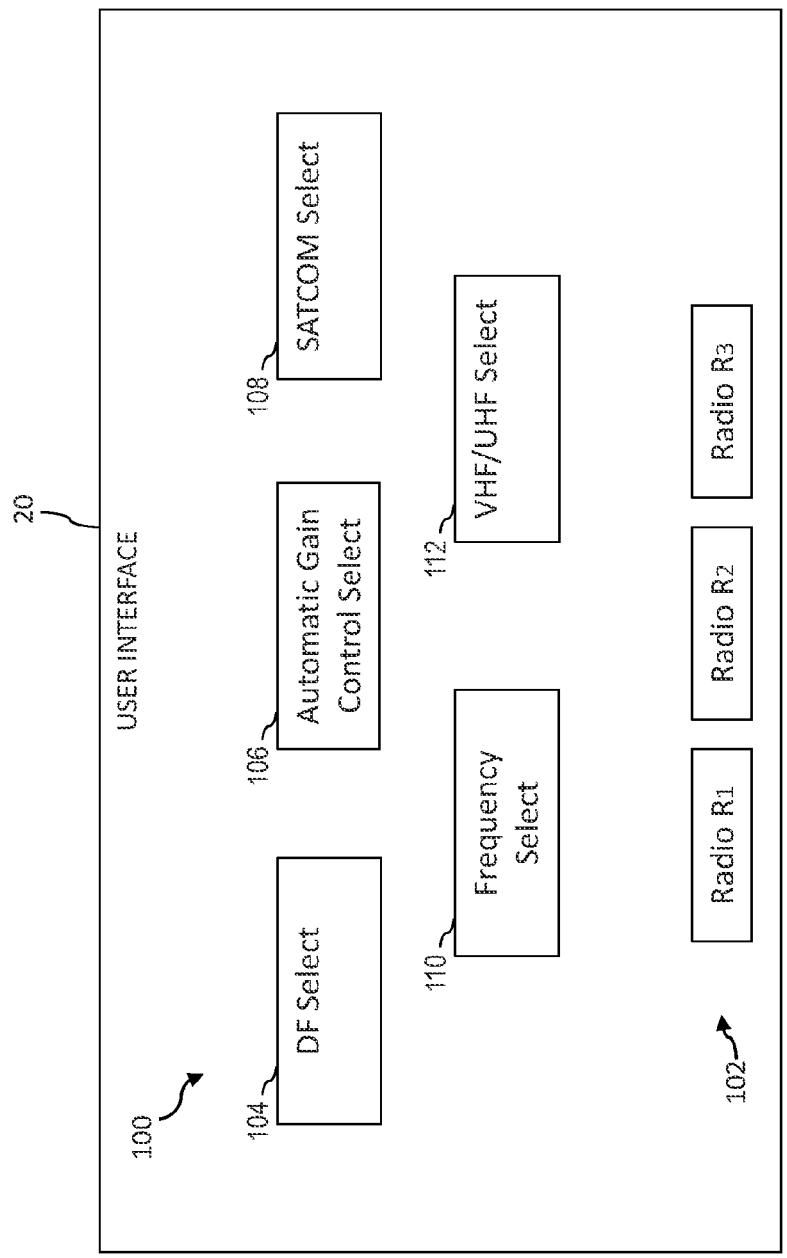
FIG. 4 illustrates an exemplary user interface of the radio communication system of FIG. 1.

Referring to FIG. 4, an exemplary user interface 20 of controller 18 is shown. In one embodiment, user interface 20 is a graphical user interface. User interface 20 includes several user inputs 100 for selection by a user or operator of radio communication system 10. User inputs 100 may be provided via a touchscreen, keypad, mouse, touchpad, trackball, keyboard, or any other suitable input device. In the illustrated embodiment, user inputs 100 include a DF Select 104, an Automatic Gain Control Select 106, a SATCOM Select 108, a Frequency Select 110, and a VHF/UHF Select 112, although other inputs may be provided. In the illustrated embodiment, user interface 20 includes a radio selector 102 for configuring each radio 12.

An operator may configure the selected antenna 14 to operate in an automatic direction finding mode with DF Select 104. Automatic Gain Control Select 106 is used to configure a selected antenna 14 to control its gain automatically. In one embodiment, automatic gain control is available only for antennas 14 operating in SATCOM. An operator may select between a high angle and a low angle SATCOM antenna 14 with SATCOM Select 108. An operator may select the operating frequency of radio 12 and/or antenna 14 with Frequency Select 110. For example, an operator may select between VHF, UHF, or SATCOM with Frequency Select 110. In one embodiment, an operator may further select a specific operating frequency with Frequency Select 110. An operator may select between the upper and lower VHF/UHF antenna 14 with VHF/UHF Select 112.

In the illustrated embodiment, controller 18 of radio communication system 10 provides several control inputs 70 to control device 52 that are representative of a selected antenna configuration. In one embodiment, radio communication system 10 includes approximately fifty different antenna configurations, although fewer or more antenna configurations may be provided. Upon receipt of control inputs 70, control device 52 identifies and implements the selected antenna configuration. Table 1 below illustrates exemplary control inputs 70 according to one embodiment.

TABLE 1

| Control Inputs 70 | |
|---|---|
| Control Input | Source |
| Antenna Select | Controller 18 |
| DF Select | Controller 18 |
| OTPI AGC | Controller 18 |
| Data Rate Select #1 | Controller 18 |
| Data Rate Select #2 | Controller 18 |
| Duplex, Radio 1 | Radio $R_1$ |
| Duplex, Radio 2 | Radio $R_2$ |
| Duplex, Radio 3 | Radio $R_3$ |
| SATCOM Antenna Select | Controller 18 |

In the illustrated embodiment, Antenna Select input corresponds to VHF/UHF Select 112 of user interface 20, DF Select input corresponds to DF Select 104, OTPI AGC input corresponds to Automatic Gain Control Select 106, and SATCOM Antenna Select input corresponds to SATCOM Select 108. The Data Rate Select inputs are based on the selected operating frequency and bandwidth of the radios 12. For example, the combination of Data Rate Select inputs #1 and #2 may be used to indicate to switch unit 16 the selected frequency and bandwidth of radios 12 and/or antennas 14 selected with Frequency Select input 110 at user interface 20.

The Duplex inputs of Table 1 are provided with radios $R_1$, $R_2$, and $R_3$, while the other inputs in Table 1 are provided with controller 18. The Duplex inputs are used to indicate to switch unit 16 whether the corresponding radio 12 is configured to transmit a SATCOM signal. As such, a SATCOM antenna 14 may be linked to the appropriate radio 12 based on the Duplex inputs. Based on the inputs 70 illustrated in Table 1, control device 52 of switch unit 16 is configured to identify and implement the selected antenna configuration.

Referring to FIG. 5, an antenna map 90 illustrating several exemplary case statements of radio communication system 10 is shown. Each case statement identifies an antenna configuration of radio communication system 10 and relates the antenna configuration to a corresponding pattern of control inputs 70. The pattern of control inputs 70 for each case statement is based on the logic state of each control input 70. In the illustrated embodiment, control device 52 is programmed with the case statements of antenna map 90 such that control device 52 implements the identified antenna configuration upon receipt of the corresponding pattern of control inputs 70. In the illustrated embodiment, antenna map 90 includes about fifty case statements, although only ten case statements are illustrated in FIG. 5. However, antenna map 90 may include any suitable number of case statements depending on the number of radios 12 and the number of antennas 14 of radio communication system 10. In the illustrated embodiment, the logic states of each control input 70 include H (high), L (low), and H/L (either high or low). Based on the logic state of each control input 70, the case statements provide a corresponding antenna configuration for implementation by control device 52.

In the illustrated embodiment of FIG. 5, antennas 14 include a lower VHF/UHF antenna, an upper VHF/UHF antenna, a low angle SATCOM antenna, and a high angle SATCOM antenna. Radios 12 illustratively include three radios (#1, #2, #3), for example, corresponding to radios $R_1$, $R_2$, and $R_3$ of FIG. 1. In the illustrated embodiment, radio #1 or $R_1$ is configured to operate in an automatic direction finding mode, as illustrated with the automatic direction finding (ADF) column of FIG. 5. Control inputs 70 of FIG. 5 correspond to the control inputs 70 listed in Table 1 above.

For example, referring to exemplary case statement #3 illustrated in FIG. 5 and in Table 2, control inputs 70 have the following states:

TABLE 2

Exemplary Case Statement #3

| Control Input | Logic State |
| --- | --- |
| Antenna Select | High |
| DF Select | Low |
| OTPI AGC | High |
| Data Rate Select #1 | Low |
| Data Rate Select #2 | High |
| Duplex, Radio 1 | High |
| Duplex, Radio 2 | Low |
| Duplex, Radio 3 | High |
| SATCOM Antenna Select | High |

Based on the pattern of control inputs 70 of case statement #3, the corresponding antenna configuration is as follows: $R_1$ is configured to communicate over a lower VHF/UHF antenna 14 and to provide automatic direction finding, $R_2$ is configured to communicate over a high angle SATCOM antenna 14, and $R_3$ is configured to communicate over an upper VHF/UHF antenna 14.

Figure 6:
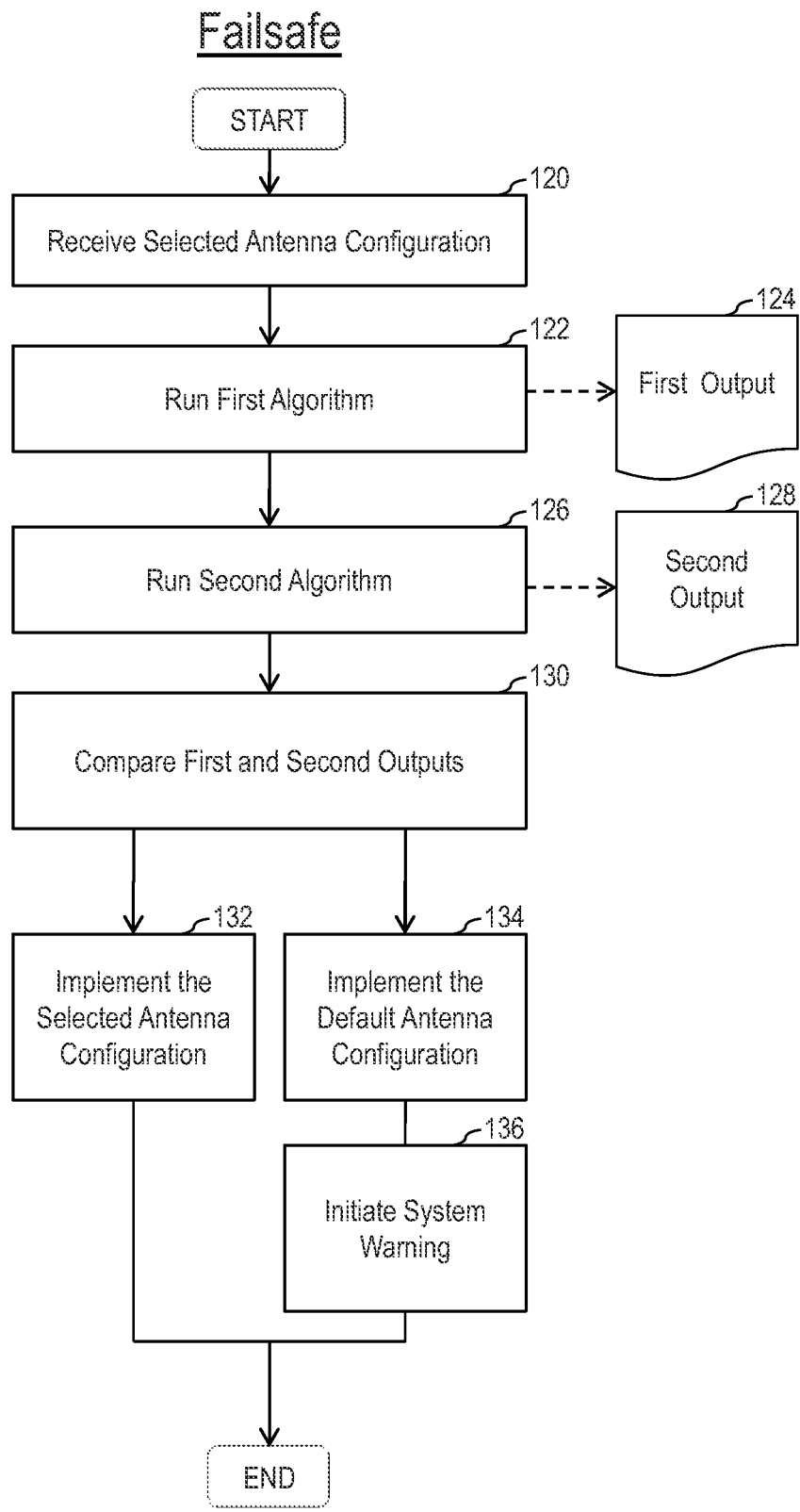
FIG. 6 is a flowchart illustrating an exemplary failsafe method according to one embodiment.

Switch unit 16 includes a failsafe feature to ensure radio communication system 10 continues to function in the event of a failure of control device 52, as illustrated in FIG. 6. Upon selection of an antenna configuration by a user at controller 18, switch unit 16 receives the selected antenna configuration via control inputs 70, as represented at block 120. Upon receipt of the antenna configuration, control device 52 of switch unit 16 executes a first algorithm (block 122) that is configured to produce a first output 124. Similarly, control device 52 of switch unit 16 executes a second algorithm (block 126) that is configured to produce a second output 128. In the illustrated embodiment, control device 52 executes the first and second algorithms simultaneously. In one embodiment, the first and second outputs 124, 128 include at least a portion of control signals 72, 74, 76 (see FIG. 3) configured to activate relays 56, 58, 82 of switch unit 16 for implementing the antenna configuration. In particular, first and second outputs 124, 128 are configured to identify or provide an antenna configuration based on the pattern of control signals 72, 74, 76. Alternatively, first and second outputs may include other digital outputs or output patterns that are comparable by control device 52.

In one embodiment, control device 52 includes circuitry programmed to execute the first and second algorithms based on control inputs 70. As illustrated in FIG. 3, a first circuitry portion 46 of control device 52 executes the first algorithm, and a second circuitry portion 48 of control device 52 executes the second algorithm. In particular, the execution of the first algorithm includes the interaction of control inputs 70 with first circuitry portion 46 resulting in first output 124. Similarly, the execution of the second algorithm includes the interaction of control inputs 70 with second circuitry portion 48 resulting in second output 128. In one embodiment, first and second circuitry portions 46, 48 of control device 52 each include a set of programmable logic gates—one set of logic gates executing the first algorithm and another set of logic gates executing the second algorithm. Each set of logic gates receives control inputs 70 and executes the respective algorithm based on control inputs 70 to produce the respective output 124, 128. Control device 52 may include additional circuitry portions for executing additional algorithms.

Upon execution of the first and second algorithms, control device 52 compares the first and second outputs 124, 128, as represented at block 130. Control device 52 selects and implements an antenna configuration based on the comparison of the first and second outputs 124, 128. As described above, first and second outputs 124, 128 may include the relay control signals 72, 74, 76 for activating relays 56, 58, 82 in accordance with the selected antenna configuration. As such, each output 124, 128 may identify an antenna configuration based on control signals 72, 74, 76. If the first and second outputs 124, 128 are the same, the selected antenna configuration (received at block 120) is implemented, as represented at block 132. Matching first and second outputs 124, 128 provides an indication that the circuitry of control device 52 is functioning properly. If the first and second outputs 124, 128 are not the same or are inconsistent, a default antenna configuration is implemented, as represented at block 134. Inconsistent or different first and second outputs 124, 128 provide an indication that the circuitry of control device 52 is malfunctioning. In one embodiment, if at least one of the first and second outputs 124, 128 provide an antenna configuration that differs from the selected antenna configuration identified with control signals 70 at block 120, the default antenna configuration is implemented. In the illustrated embodiment, a system warning is provided upon detection of inconsistent or different first and second outputs 124, 128, as represented at block 136. The system warning may be provided to user interface 20 of controller 18 and/or displayed on display 38 of switch unit 16 (see FIG. 2). The system warning may be an audible or visual warning, for example. In one embodiment, switch unit 16 remains in the default antenna configuration until the system error is corrected or the system warning is overridden.

In one embodiment, the default configuration implemented at block 134 corresponds to the configuration shown in case statement #1 of FIG. 5. In particular, in a default antenna configuration, radio $R_1$ communicates over a lower VHF/UHF antenna, radio $R_2$ communicates over an upper VHF/UHF antenna, and radio $R_3$ communicates over a high angle SATCOM antenna.

The default configuration implemented at block 134 may be the same antenna configuration if switch unit 16 loses power. For example, when switch unit 16 loses power or malfunctions, switch unit 16 implements a power-loss failsafe as relays 56, 58, 82 default to a non-activated state. In one embodiment, the non-activated state of relays 56, 58, 82 depends on whether the relay contacts are normally open or normally closed. As such, when switch unit 16 loses power, or when the default configuration is implemented at block 134 of FIG. 6 due to a malfunctioning control device 52, a common default antenna configuration (e.g., case statement #1 of FIG. 5) is provided by switch box 16 to allow continued communication between radios 12 and antennas 14. As such, radio communication over system 10 is possible in the event of a failure of switch unit 16.

In the illustrated embodiment, switch unit 16 includes additional failsafe features to maintain functionality in the event of a system error. For example, if control inputs 70 do not match a pattern or configuration recognized by control device 52 (e.g., as determined by antenna map 90), a default antenna configuration is implemented. In one embodiment, the default configuration implemented due to an improper control input pattern is the same default configuration implemented at block 134 of FIG. 6 and in a power-loss failsafe condition.

Referring to FIG. 9, exemplary portion 94 of source code 92 verifies that the output of control device 52 corresponds to the control inputs 70 received at control device 52 for the selection of an antenna configuration. Portion 94 of code 92 illustratively verifies that case statements #1 through #3 of FIG. 5 produced the proper output. As described herein, the output of control device 52 implements the selected antenna configuration. If the output of control device 52 is not as expected, source code 92 generates a "BIT failure" and implements the default antenna configuration, as described herein.

Figure 7:
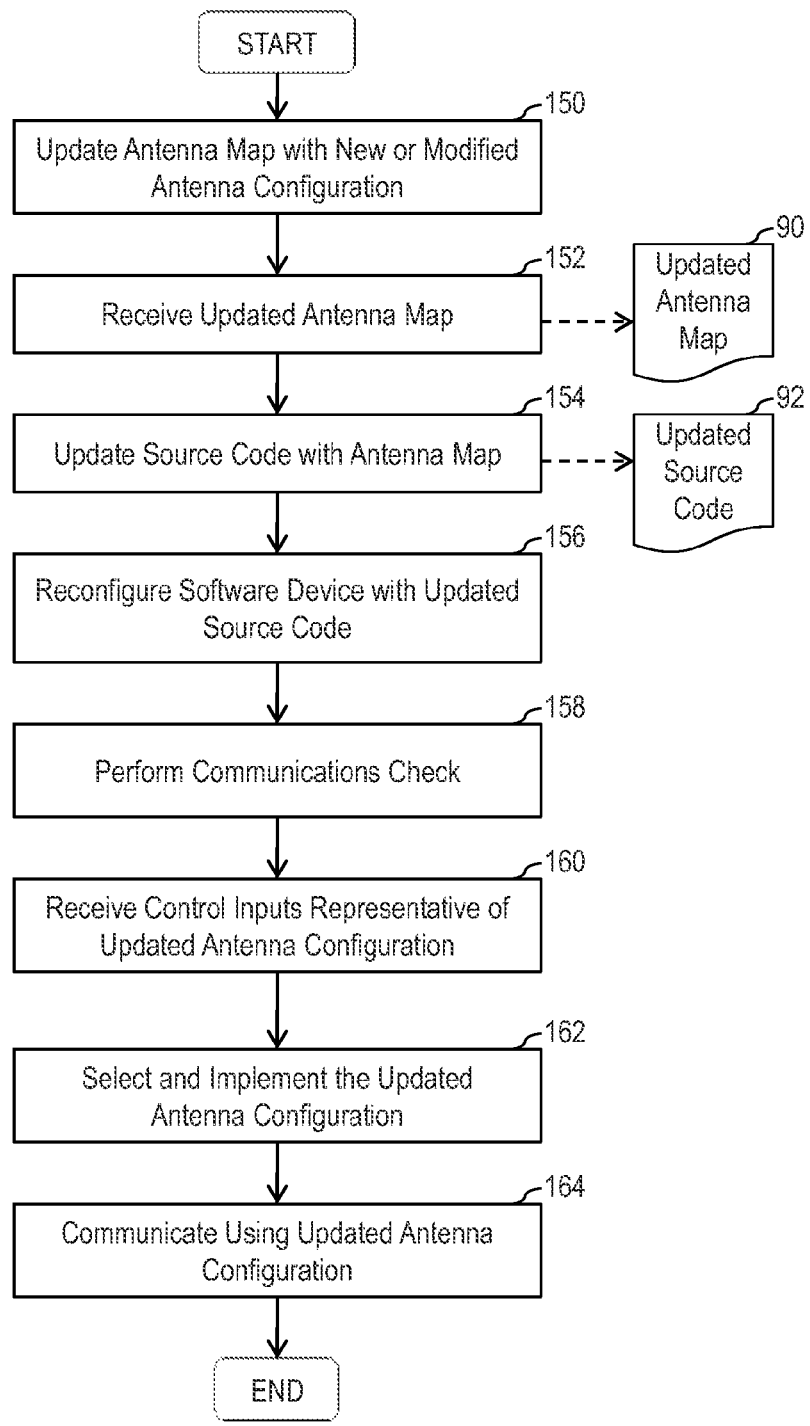
FIG. 7 is a flowchart illustrating an exemplary method of automatically updating the control device of FIG. 3.

In the illustrated embodiment, switch unit 16 is reconfigurable. In particular, switch unit 16 may be re-programmed with an updated antenna map 90 containing new or modified case statements corresponding to new or modified antenna configurations, as described herein. In one embodiment, switch unit 16 may be automatically updated based on a modification to antenna map 90, as illustrated in FIG. 7 and described herein.

Antenna map 90 may be updated with one or more new or modified case statements. As represented at block 150 of FIG. 7, antenna map 90 is updated with a new or modified antenna configuration. For example, a new or additional case statement may be added to antenna map 90 identifying a new antenna configuration associated with a new control input pattern. Further, a case statement may be modified in antenna map 90 to identify a modified antenna configuration corresponding to an existing pattern of control inputs 70. Alternatively, a new or modified case statement may be added to antenna map 90 that identifies a modified pattern of control inputs 70 corresponding to an existing antenna configuration. In one embodiment, antenna map 90 is updated via user interface 20 of controller 18, although antenna map 90 may be modified on another computer system. In one embodiment, antenna map 90 is a spreadsheet document, such as a Microsoft Excel document.

At block 152, updated antenna map 90 is received by a computer system, such as controller 18, configured to program control device 52. For example, controller 18 may include a software program and programming hardware (e.g. cable connector) configured to program control device 52. In one embodiment, the steps at blocks 150 and 152 are performed simultaneously. Alternatively, antenna map 90 may be updated on one computer system and transferred to another computer system configured to program control device 52. Alternatively, switch unit 16 may include a processor configured to program control device 52 with the updated antenna map 90.

At block 154, source code 92 used to program control device 52 is updated automatically with antenna map 90. For example, source code 92 may be included in a software package configured to import or link to other locally stored files. In one embodiment, antenna map 90 and source code 92 are linked together such that any update to antenna map 90 causes an automatic update to source code 92. Alternatively, an operator may import the antenna map 90 into source code 92 or the software package containing source code 92 to cause an automatic update of source code 92 with the data in antenna map 90.

As represented by block 156, control device 52 is reconfigured with the updated source code 92. In one embodiment, source code 92 is downloaded to control device 52, for example, with a data cable. Switch unit 16 may include a plug connector configured to couple to the data cable such that control device 52 is not required to be removed from switch unit 16 for reconfiguration. The plug connector may be provided inside or outside of housing 30. Source code 92 is configured to re-program the logic gates of control device 52 based on the case statements provided with antenna map 90.

In one embodiment, controller 18 is the computer system used to re-program control device 52 with source code 92.

In one embodiment, upon updating antenna map 90 at block 150, source code 92 is automatically updated at block 154 and control device 52 is automatically updated at block 156. In one embodiment, an update to antenna map 90 or source code 92 triggers the programming computer system containing the updated source code 92 to automatically re-program control device 52 with the updated source code 92. In one embodiment, the computer system containing source code 92 contains an identifier readable by switch unit 16 and configured to trigger an automatic update of control device 52 with the updated source code 92. In this embodiment, control device 52 includes circuitry and/or software configured to monitor the identifier of the programming computer system to determine when the source code 92 has been updated. The identifier contained in the programming computer system may identify a version of source code 92, a date of the last update of source code 92, or any other suitable identifier used to trigger an automatic source code update of control device 52. Upon recognition that the most recent source code 92 used to program control device 52 is out of date based on the identifier, control device 52 sends a request to the programming computer system to send or download the updated source code 92 to the control device 52.

In one embodiment, control device 52 includes a memory configured to store the source code 92 or other software for programming control device 52. As such, control device 52 includes a first programming file or source code 92 and the programming computer system includes a second programming file or source code 92. Upon an update to the second programming file of the computer system, the first programming file of control device 52 is automatically updated or replaced with the second programming file. Control device 52 may compare the identifier of the computer system associated with the second programming file to an identifier stored in the memory of control device 52 associated with the loaded first programming file to determine when the loaded first programming file needs updating.

In one embodiment, control device 52 is updated wirelessly. For example, switch unit 16 may include a wireless receiver configured to receive data and control signals from the programming computer system containing the updated source code 92. As such, the programming computer system transmits the updated code wirelessly to switch unit 16 to program control device 52.

After reconfiguration of control device 52, switch unit 16 is ready to continue operation in radio communication system 10. In one embodiment, a communications check is performed on switch unit 16 prior to normal operation to verify that several or all antenna configurations are working properly and/or to confirm that control device 52 has been properly reconfigured, as represented by block 158. In one embodiment, switch unit 16 receives control inputs 70 representative of the updated antenna configuration (i.e., the antenna configuration updated in antenna map 90 at block 150), as represented at block 160. Control device 52 identifies the updated antenna configuration based on the received control inputs 70 and causes switch unit 16 to implement the updated antenna configuration, as represented at block 162 and described herein. At block 164, radios 12 of radio communication system 10 communicate over antennas 14 according to the updated antenna configuration.

Figure 8:
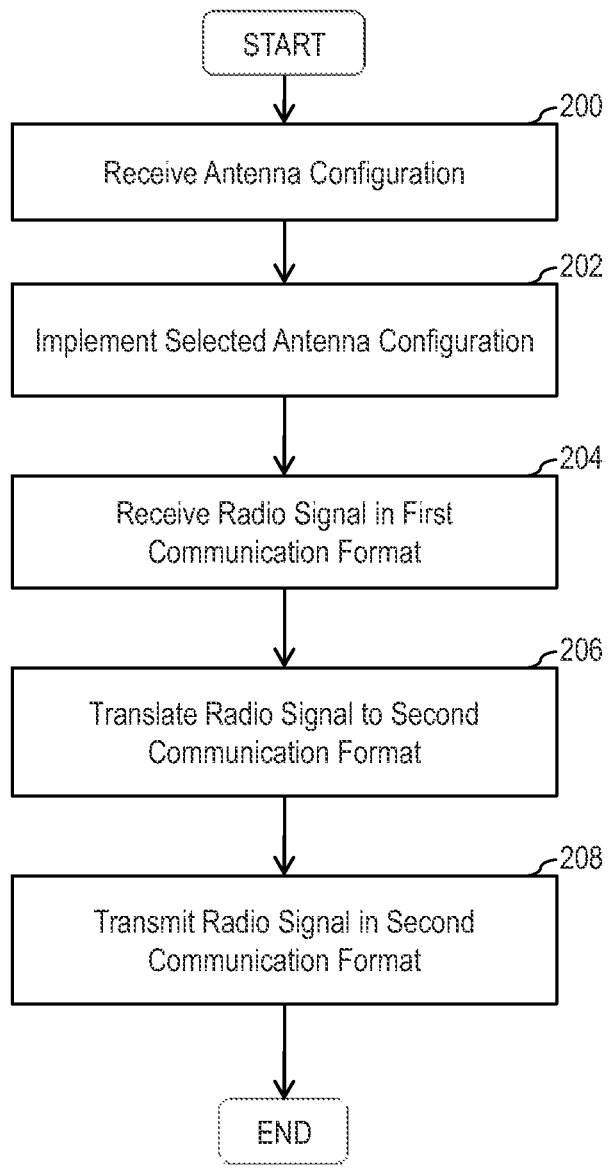
FIG. 8 is a flowchart illustrating an exemplary method of relaying a radio signal between multiple radio stations.

In one embodiment, radio communication system 10 is used as a radio relay system that relays radio signals received from one remote radio station to another remote radio station. Referring to FIG. 8, switch unit 16 receives a selected antenna configuration, as represented at block 200. In the illustrated embodiment, the selected antenna configuration is based on control inputs 70 received from controller 18, as described herein. At block 202, switch unit 16 implements the selected antenna configuration by selectively coupling radios 12 to the appropriate antennas 14, as described herein. At block 204, radio communication system 10 receives a radio signal from a remote radio station in a first communication format. For example, the first communication format of the radio signal may include a VHF/UHF, dual frequency, or SATCOM frequency signal. In the illustrated embodiment, a first radio 12 receives the radio signal over a first antenna 14 tuned to the first communication format. In one embodiment, the first radio 12 translates the received radio signal to a second communication format, as represented at block 206. For example, the second communication format of the radio signal may include any of a VHF/UHF, dual frequency, or SATCOM frequency signal. At block 208, the first radio 12 transmits the radio signal to a second radio 12, and the second radio 12 transmits the radio signal in the second communication format over a second antenna 14 tuned to the second communication format. In one embodiment, the second radio 12 performs the translation step at block 206. In one embodiment, the first radio 12 receives the radio signal over the first antenna 14, translates the radio signal to the second communication format, and transmits the radio signal directly over the second antenna 14.

Exemplary case statement #8 of FIG. 5 illustrates the radio relay functionality of radio communication system 10. Referring to case statement #8, radios $R_1$ and $R_2$ serve as relays between upper and lower VHF/UHF antennas 14. In particular, if radio $R_1$ is receiving, radio $R_1$ receives signals over an upper VHF/UHF antenna 14 and provides the received signal to radio R2, and radio R2 transmits the received signal over a lower VHF/UHF antenna 14. In one embodiment, one of radios $R_1$ and $R_2$ translates the received radio signal to a different frequency prior to radio $R_2$ transmitting the signal over the lower VHF/UHF antenna 14. Similarly, if radio $R_2$ is receiving, radio $R_2$ receives signals over the lower VHF/UHF antenna 14 and provides the received signal to radio $R_1$, and radio $R_1$ transmits the received signal over the upper VHF/UHF antenna 14. Further, $R_3$ is configured to communicate over the high angle SATCOM antenna 14 in the illustrated case statement #8.

In one embodiment, radio communication system 10 is located on an aircraft and relays radio signals between two ground station radios. Radio communication system 10 may alternatively relay radio signals between two remote airborne radio systems or between a ground station and an airborne station. Radio communication system 10 may also relay radio signals between other radio stations, including maritime radio stations or radio systems of law enforcement vehicles. In one embodiment, radio communication system 10 is used to relay or route radio frequency signals from one radio system to a different radio system operating on a different frequency or bandwidth or having a different function. For example, radio communication system 10 may route RF signals from a police or law enforcement radio system to a fire department system that operates on a different frequency than the law enforcement radio system.

In another embodiment, radio communication system 10 is configured to automatically manage the interconnection of multiple radios 12 to multiple antennas 14 without receiving an antenna configuration from user interface 20. In particular, switch unit 16 may be configured to provide the antenna configuration based on one or more parameters. The parameters may be provided from the requesting radio 12, the available antennas 14, and/or conditions or parameters contained in control device 52 or another processing device. For example, upon receipt of one or more control signals from a radio 12, control device 52 of switch unit 16 may automatically route an RF signal from the radio 12 to an appropriate or available antenna 14. Based on the control signals and/or the RF signal from the requesting radio 12, the control device of switch unit 16 may determine the type of antenna 14 requested or required by radio 12, identify the available antennas 14, and select an appropriate antenna 14 for connecting to the radio 12. In one embodiment, user interface 52 provides an override feature to override the automatic interconnection of radios 12 to antennas 14 by switch unit 16. Upon receiving an override signal from user interface 52, the automatic interconnection by switch unit 16 is disabled, and switch unit 16 interconnects radios 12 and antennas 14 based on control inputs 70 received from user interface 52 and radios 12, as described herein.

In one embodiment, control device 52 of switch unit 16 may include a sequencing portion configured to manage conflicts between radios 12 and antennas 14. For example, each radio 12 and antenna 14 may be assigned an interrupt priority identifiable by the sequencing portion of switch unit 16. The control device 52 of switch unit 16 may manage the sequence of transmission by radios 12 over antennas 14 upon the occurrence of communication conflicts, e.g., upon multiple radios 12 requesting communication over a single antenna 14. For example, switch unit 16 routes a first radio 12 to a first antenna 14 for communication over the first antenna 14. Upon receiving a transmission request from a second radio 12 for communication over the first antenna 14, switch unit 16 determines whether the priority of the requesting second radio 12 is sufficient to override or interrupt communication by the first radio 12 over the first antenna 14. If the second radio 12 has a superior priority to the first radio 12, switch unit 16 halts communication over the first antenna 14 by the first radio 12 and allows the second radio 12 to communicate over the first antenna 14. Switch unit 16 may route first radio 12 to a second antenna 14 or hold communication by the first radio 12 until the second radio 12 has completed communication over the first antenna 14. If the second radio 12 has an inferior priority to the first radio 12, switch unit 16 allows the first radio 12 to continue communication over the first antenna 14. Further, switch unit 16 may couple the second radio 12 to a second antenna 14 or hold communication by the second radio 12 until the first radio 12 has completed communication over first antenna 14.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A failsafe system for a radio communication system, the failsafe system including:
   a plurality of antennas;
   a plurality of radios configured to communicate a radio signal over the plurality of antennas;
   a switch assembly including a control device and a plurality of switches in communication with the control device, the switch assembly being configured to selectively couple the plurality of radios to the plurality of antennas based on an antenna connection scheme, the control device including a first circuitry portion and a second circuitry portion;

a controller coupled to the switch assembly and configured to provide a plurality of control signals to the control device of the switch assembly, the plurality of control signals identifying an antenna connection scheme for coupling each radio to at least one antenna, the control device being configured to implement the identified antenna connection scheme based on the plurality of control signals, wherein the control signals are received by the first circuitry portion and the second circuitry portion of the control device, the first circuitry portion being configured to produce a first output based on the control signals, the second circuitry portion being configured to produce a second output based on the control signals, the first output being configured to identify a first antenna connection scheme and the second output being configured to identify a second antenna connection scheme, wherein the switch assembly implements a default antenna connection scheme upon the first antenna connection scheme identified with the first output being different from the second antenna connection scheme identified with the second output.

2. The failsafe system of claim 1, wherein the switch assembly further implements the default antenna connection scheme upon the first and second antenna connection schemes being different from the identified antenna connection scheme provided with the plurality of control signals.

3. The failsafe system of claim 2, wherein the switch assembly initiates a system warning upon implementation of the default antenna connection scheme, the system warning being provided to the controller.

4. The failsafe system of claim 1, wherein the switch assembly implements the identified antenna connection scheme provided with the plurality of control signals upon the first and second antenna connection schemes being the same as the identified antenna connection scheme.

5. The failsafe system of claim 4, wherein the plurality of switches are coupled to the plurality of radios and the plurality of antennas, wherein the switch assembly is configured to implement the identified antenna connection scheme by selectively energizing the plurality of switches with at least one of the first and second outputs to connect each radio to at least one antenna.

6. The failsafe system of claim 5, wherein the switch assembly implements the default antenna connection scheme by at least one of grounding and removing power to the plurality of switches.

7. The failsafe system of claim 1, wherein the controller includes a user interface having a plurality of user inputs for selecting an antenna connection scheme, the identified antenna connection scheme provided with the control signals being based on the selected antenna connection scheme at the user interface.

8. The failsafe system of claim 7, wherein the plurality of control inputs cooperate to form a control input pattern, the control device identifying the selected antenna connection scheme based on a recognition of the control input pattern, the switch assembly further implementing the default antenna connection scheme upon the control input pattern being unrecognizable by the control device.

9. The failsafe system of claim 1, wherein the switch assembly further implements the default antenna connection scheme upon the switch assembly experiencing a power failure.

10. The failsafe system of claim 1, wherein the first and second circuitries include a plurality of logic gates.

11. A failsafe method for a radio communication system, the method comprising the steps of:

providing a plurality of antennas, a plurality of radios configured to communicate over the plurality of antennas, a switch assembly including a control device, and a controller coupled to the switch assembly, the control device including a first circuitry portion and a second circuitry portion, the switch assembly being configured to selectively couple the plurality of radios to the plurality of antennas based on an antenna connection scheme;

providing a plurality of control signals to the control device of the switch assembly, the plurality of control signals identifying a selected antenna connection scheme for coupling each radio to at least one antenna;

executing a first algorithm with the first circuitry portion to produce a first output, the first algorithm being based on the plurality of control signals;

providing a first antenna connection scheme with the first output;

executing a second algorithm with the second circuitry portion to produce a second output, the second algorithm being based on the plurality of control signals;

providing a second antenna connection scheme with the second output;

comparing the first output and the second output; and implementing a default antenna connection scheme upon the first antenna connection scheme provided with the first output being different from the second antenna connection scheme provided with the second output.

12. The method of claim 11, further including the step of implementing the default antenna connection scheme upon the first and second antenna connection schemes being different from the selected antenna connection scheme identified with the plurality of control signals.

13. The method of claim 12, further including the step of initiating a system warning upon implementation of the default antenna connection scheme, the system warning including at least one of an audio warning and a visual warning.

14. The method of claim 11, further including the step of implementing the selected antenna connection scheme upon the first and second antenna connection schemes being the same as the selected antenna connection scheme.

15. The method of claim 11, further including the step of implementing the default antenna connection scheme upon at least one of the switch assembly and the controller losing power.

16. The method of claim 11, wherein the first circuitry portion includes a plurality of logic gates, wherein the execution of the first algorithm includes the interaction of the plurality of control signals with the plurality of logic gates of the first circuitry portion.

17. The method of claim 16, wherein the second circuitry portion includes a plurality of logic gates, wherein execution of the second algorithm includes the interaction of the plurality of control signals with the plurality of logic gates of the second circuitry portion.

18. A method of selectively coupling radios to antennas in a radio communication system, the method comprising the steps of:

providing a plurality of antennas, a plurality of radios configured to communicate over the plurality of antennas, a switch assembly including a programmable device, and a controller configured to provide a plurality of control inputs to the programmable device of the switch assembly, the plurality of control inputs cooperating to form a control input pattern representative of an antenna configuration, the switch assembly being configured to selectively couple each radio to at least one antenna based on the antenna configuration;

receiving an antenna map including a plurality of case statements, each case statement associating an antenna configuration with a control input pattern, the antenna map being linked to a source code for programming the programmable device of the switch assembly, the source code providing the plurality of case statements of the antenna map to the programmable device, the source code including an identifier;

modifying a first case statement of the antenna map, the first case statement associating a first antenna configuration with a first control input pattern, the modifying step including modifying at least one of the first antenna configuration and the first control input pattern;

automatically updating the source code with the modified first case statement upon modifying the first case statement, the updating step including modifying the identifier of the source code;

reconfiguring the programmable device with the updated source code based on the modified identifier of the updated source code;

implementing the first antenna configuration with the programmable device based on the modified first case statement; and communicating between the plurality of radios and the plurality of antennas according to the first antenna configuration;

wherein the implementing step includes providing a plurality of control inputs to the programmable device having a control input pattern representative of the first antenna configuration;

wherein the programmable device includes a first circuitry portion and a second circuitry portion, wherein the implementing step further includes the steps of executing a first algorithm with the first circuitry portion to produce a first output and executing a second algorithm with the second circuitry portion to produce a second output, the first and second algorithms being based on the plurality of control signals, the first output identifying a second antenna configuration and the second output identifying a third antenna configuration.

19. The method of claim 18, wherein the modifying step includes at least one of associating an existing antenna configuration with a modified control input pattern and associating an existing control input pattern with a modified antenna configuration.

20. The method of claim 18, wherein the modifying step further includes providing an additional case statement to the antenna map, the additional case statement associating an additional antenna configuration with an additional control input pattern.

21. The method of claim 18, wherein the switch assembly includes a plurality of switches in communication with the programmable device, the plurality of radios, and the plurality of antennas, the implementing step including selectively activating the plurality of switches to connect each radio to at least one antenna based on the first antenna configuration.

22. The method of claim 18, further including the step of performing a communications check prior to the communicating step, the communications check being configured to confirm proper functionality of the programmable device.

23. The method of claim 18, wherein the reconfiguring step includes monitoring the identifier of the source code and requesting the updated source code upon detecting a modification to the identifier.

24. The method of claim 18, wherein the implementing step further includes the steps of comparing the first output and the second output and implementing a default antenna configuration upon at least one of the second antenna configuration provided with the first output and the third antenna configuration provided with the second output being different from the first antenna configuration.

25. The method of claim 24, wherein the switch assembly includes a plurality of switches in communication with the programmable device, the plurality of radios, and the plurality of antennas, the implementing step including selectively activating the plurality of switches with at least one of the first and second outputs.

26. The method of claim 25, wherein implementation of the default antenna configuration includes at least one of grounding and removing power to the plurality of switches.

* * * * *

UNITED STATES PATENT AND TRADEMARK OFFICE
CERTIFICATE OF CORRECTION

| | | |
|---|---|---|
| PATENT NO. | : 8,478,335 B2 | Page 1 of 1 |
| APPLICATION NO. | : 13/070326 | |
| DATED | : July 2, 2013 | |
| INVENTOR(S) | : Nathan L. Thomas and James M. Seals | |

It is certified that error appears in the above-identified patent and that said Letters Patent is hereby corrected as shown below:

On the Title page of the patent in the second column, the listed name of the attorney directly after the "(74) Attorney, Agent, or Firm" is misspelled. The correct spelling of the name is Christopher A. Monsey.

Signed and Sealed this
Third Day of September, 2013

Teresa Stanek Rea
*Acting Director of the United States Patent and Trademark Office*